Patented Jan. 5, 1937

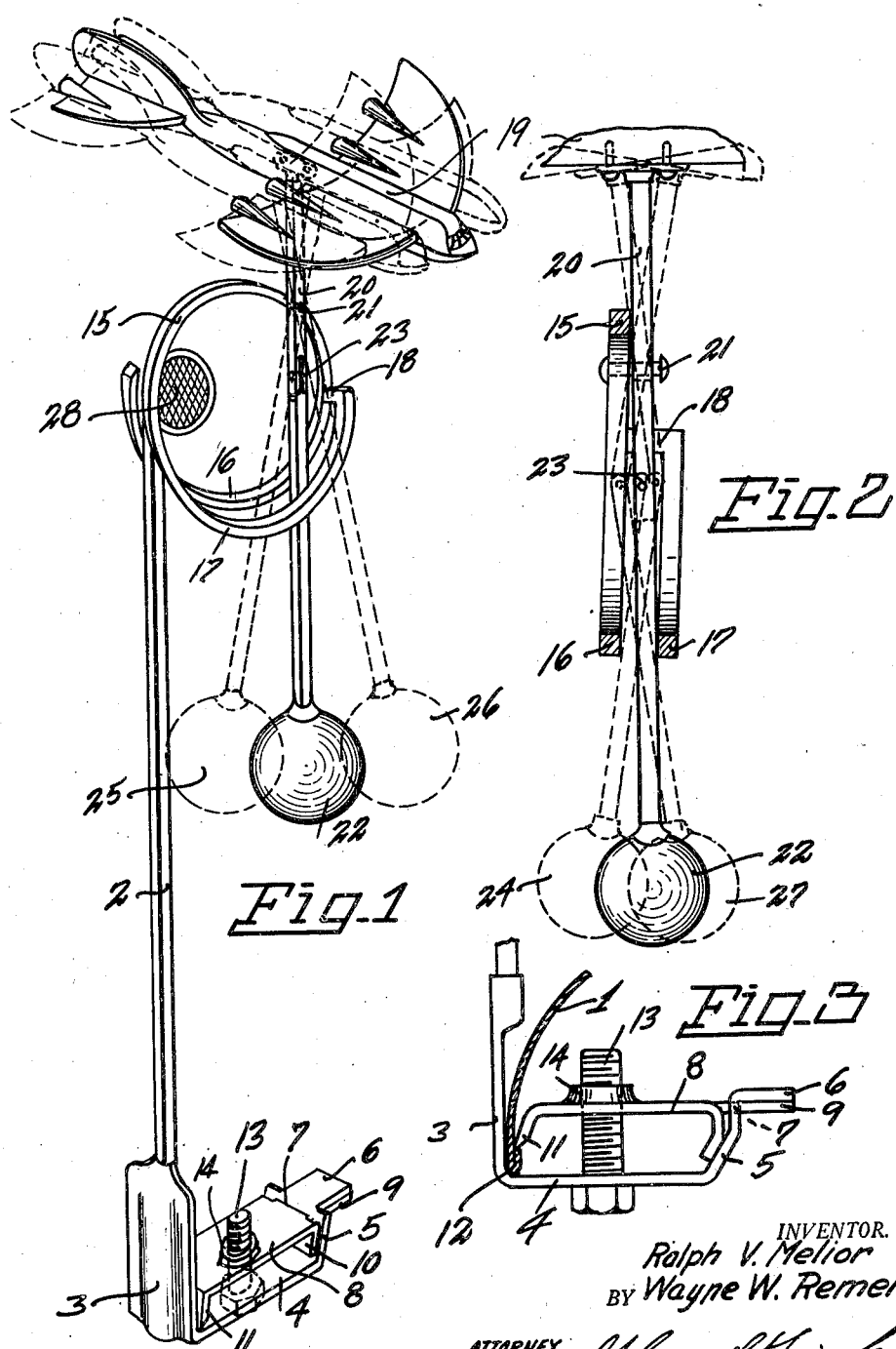

2,066,641

UNITED STATES PATENT OFFICE 2,066,641

FENDER ATTACHMENT

Ralph V. Melior and Wayne W. Remer, Spokane, Wash.

Application March 14, 1936, Serial No. 68,890

6 Claims. (Cl. 116—114)

This invention relates to an improved ornament and signal adapted to be applied to the fender of an automobile and serve not only as an ornament for an automobile but also as a signal or gauge which projects upwardly from the fender and can be easily seen by the driver of the automobile to which it is applied and also by the driver of another automobile and eliminate danger of damage due to two cars passing too close to each other.

One object of the invention is to so construct the device that it can be very easily applied to a fender and, when in place, will be prevented from accidentally slipping from the fender.

Another object of the invention is to so construct the attaching portion of the device that once it has been attached to a fender it will be practically impossible for a thief or mischievous person to remove it.

Another object of the invention is the provision of a signal including a miniature airplane so mounted that, during operation of an automobile, the airplane may have movements imparted to it simulating those of an airplane in flight.

The invention is illustrated in the accompanying drawing, wherein:

Figure 1 is a perspective view of the invention.

Figure 2 is a fragmentary sectional view taken through the upper portion of the device.

Figure 3 is a fragmentary view illustrating the manner in which the device is secured to the fender of an automobile.

This ornament and signal is intended to be attached to the fender 1 of an automobile and project upwardly therefrom in such a position that it may be easily seen by the driver of the automobile to which it is attached as well as by the driver of another car. Therefore, the driver of the automobile to which the device is attached can easily determine whether he can pass another car without his fender being damaged by striking the other car or damage being done to the other car. In a like manner the driver of another car will have his attention attracted by the signal and will guide his car in such a manner that ample room will be provided to permit the cars to pass without danger of colliding.

The signal has a standard 2 in the form of a metal rod which may be rectangular in cross section or any other cross sectional shape. It may be of any length desired and at its lower end carries a bracket 3 which may be formed separate from the standard and welded or otherwise united thereto or formed by flattening an end portion of the metal rod from which the standard is formed. This bracket is formed with a lateral extension or bridge 4 having an upstanding arm 5 at its other end and, upon referring to Figure 3, it will be seen that the arm projects upwardly at an incline and then extends parallel to the longer arm from which the standard projects. The upper end portion of the arm 5 is bent outwardly to form a tongue 6 which is of reduced width and at a short distance below the inner end of the tongue, the arm is formed with a transversely extending slot 7. A jaw 8, which is formed of stiff metal, cooperates with the bracket 3 and has one end portion cut longitudinally to provide a center tongue 9 of the proper width to pass through the slot 7 and side tongues 10 which bear against the inner face of the arm 5 at opposite sides of the slot. At the other end of the clamp is a depending lip 11 having a sharpened lower edge for engaging the inwardly folded bead 12 of the fender. A bolt 13 passes upwardly through an opening formed in the bridge 4 of the bracket and has its upper portion threaded through the boss 14 of the jaw 8 so that when the bolt is turned in a tightening direction the jaw will be drawn downwardly and the arms or tongues 10 and 11 moved into gripping contact with the arm 5 and the bead 12 of the fender. After the bolt has been tightened as much as possible, a blow torch or the like will be employed to heat the tongues 6 and 9 and solder, with which their contacting faces are coated, will be melted to firmly unite the two tongues. It will thus be seen that once the clamp formed by the bracket and the jaw has been tightened for firm gripping engagement with the fender it cannot slip out of engagement with the fender even if the bolt works loose or is deliberately loosened. Therefore, the device cannot accidentally become detached from the fender or be easily removed by a thief or a mischievous person.

At its upper end the standard carries a frame 15 formed from a coil of strong metal to provide lower portions 16 and 17 which are spaced from each other. The standard is welded to the frame or coil at one side thereof, between the spaced portions, and at the other side of the frame the forward portion 17 terminates in a bent end 18 welded or otherwise secured to provide a strong construction and serve as an abutment finger. A miniature airplane 19 is disposed over the frame and carries a depending pendulum 20 which is mounted for swinging movement transversely of the frame by a pin 21 passing through an opening of sufficient size to loosely mount the pendulum and also permit tilting movement thereof longitudinally of the automobile upon the pin. It will thus be seen that the pendulum is mounted for universal tilting movement upon the pin. The pendulum extends downwardly between the spaced portions 16 and 17 and carries a weight 22 at its lower end to counterbalance the airplane and cause the pendulum to swing easily and attention is called to the fact that below the pin 21 a hinged joint 23 which permits the lower portion of the pendulum to swing forwardly and rearwardly between the spaced portions 16 and 17 of the frame and tilt the upper portion of the pendulum upon the pin to shift the airplane forwardly and rearwardly with a dipping movement. The abutment finger 18 limits swinging of the pendulum transversely of the frame in one direction and the upper end of the standard limits its transverse swinging movement in the other direction.

When this device is in use, it is secured to the fender at the driver's side of the automobile or the other side thereof and projects upwardly to such an extent that it can be easily seen by the driver. Forward movement of the automobile causes the weight to swing rearwardly, as shown at 24 in Figure 2, and the upper portion of the pendulum above the pin will tilt rearwardly and the front of the airplane upwardly somewhat. If a turn is made towards the left the weight swings to the position indicated by the numeral 25 in Figure 1 and the airplane will bank towards the left, whereas if the automobile is turned towards the right, the weight will swing towards the left to the position indicated by the numeral 26 and the airplane will bank towards the right as though banking for a right turn. When the automobile is slowed down to reduce speed or bring it to a stop, the weight swings forwardly to the position indicated by the numeral 27 in Figure 2 and the airplane will nose down forwardly. It will thus be seen that the device will be very attractive as well as serving as a signal or gauge to eliminate likelihood of a collision due to a person misjudging the extent to which the fenders project from the body of the automobile. A reflector 28 has been shown mounted at a side of the frame over the upper end of the standard to reflect light from the headlights of an approaching automobile and thus eliminate likelihood of the driver of an approaching automobile not seeing the signal. An electric light of a conventional construction may be substituted in place of the reflector is so desired.

Having thus described the invention, what is claimed is:

1. A device of the character described comprising a standard, a frame at the upper end of said standard having its lower portion formed with a transversely extending passage, a pendulum extending vertically and having upper and lower sections hinged to each other, the lower section extending through said passage and the upper section being pivotally connected with the upper portion of said frame and projecting upwardly above the same, and a miniature airplane mounted at the upper end of the pendulum.

2. A device of the character described comprising a standard, a frame carried by said standard and projecting to one side thereof, said frame having its lower portion provided with bars spaced one in front of the other, a pendulum extending vertically and having a weight at its lower end and an object at its upper end, said pendulum extending between the bars and being loosely pivoted to the upper portion of said frame for tilting movement transversely of a vehicle and forwardly and rearwardly thereof, a hinge joint being provided in the pendulum intermediate the depth of the frame whereby upper and lower portions of the pendulum may tilt forwardly and rearwardly relative to each other.

3. A device of the character described comprising a standard, a frame carried by said standard and projecting from one side thereof, said frame having its lower portion formed with front and rear bars, a pendulum extending vertically between the front and rear bars and having upper and lower sections hinged to each other intermediate the upper and lower ends of the frame for forward and rear tilting movement of the lower portion, the upper section being pivoted to the upper portion of said frame for universal tilting movement and projecting above the frame, and an object carried at the upper end of the upper section.

4. A device of the character described comprising a standard, a frame carried by said standard and projecting from one side thereof, said frame having its lower portion formed with a transversely extending passage open at its top and bottom and closed at its ends, a pendulum having a weighted lower section extending vertically through said passage and an upper section pivoted intermediate its length to the upper portion of the frame and projecting upwardly therefrom, the upper and lower sections having their ends meeting intermediate the depth of the frame and hinged to each other for tilting movement, and an object carried by the upper section above said frame.

5. A device of the character described comprising a standard, a frame carried by said standard and having its lower portion formed with a transversely extending passage open at its top and bottom, a pendulum extending vertically and having an upper section pivoted to the upper portion of said frame for universal tilting movement and projecting upwardly above the frame, a horizontally extending object carried by the upper section above the frame, a lower section for the pendulum extending through said passage with its upper end hinged to the lower end of the upper section and having fulcruming engagement with front and rear walls of the passage when swung forwardly and rearwardly whereby the upper section tilts in a direction opposite to the lower section, and a weight for the lower end of the lower section.

6. A device of the character described comprising a standard, a frame carried by said standard, a pendulum formed of upper and lower sections, the upper section being pivoted for universal tilting movement intermediate its length to the upper portion of said frame and carrying an object at its upper end, the lower section carrying a weight at its lower end and having its upper end pivoted to the lower end of the upper section for forward and rearward tilting movement, and means to fulcrum forward and rearward movement whereby the upper section will tilt forwardly and rearwardly in a direction opposite to that of the lower section.

RALPH V. MELIOR.
WAYNE W. REMER.